M. IHNAT.
RAILWAY SAFETY APPLIANCE.
APPLICATION FILED DEC. 31, 1917.
1,349,834.
Patented Aug. 17, 1920.
2 SHEETS—SHEET 2.
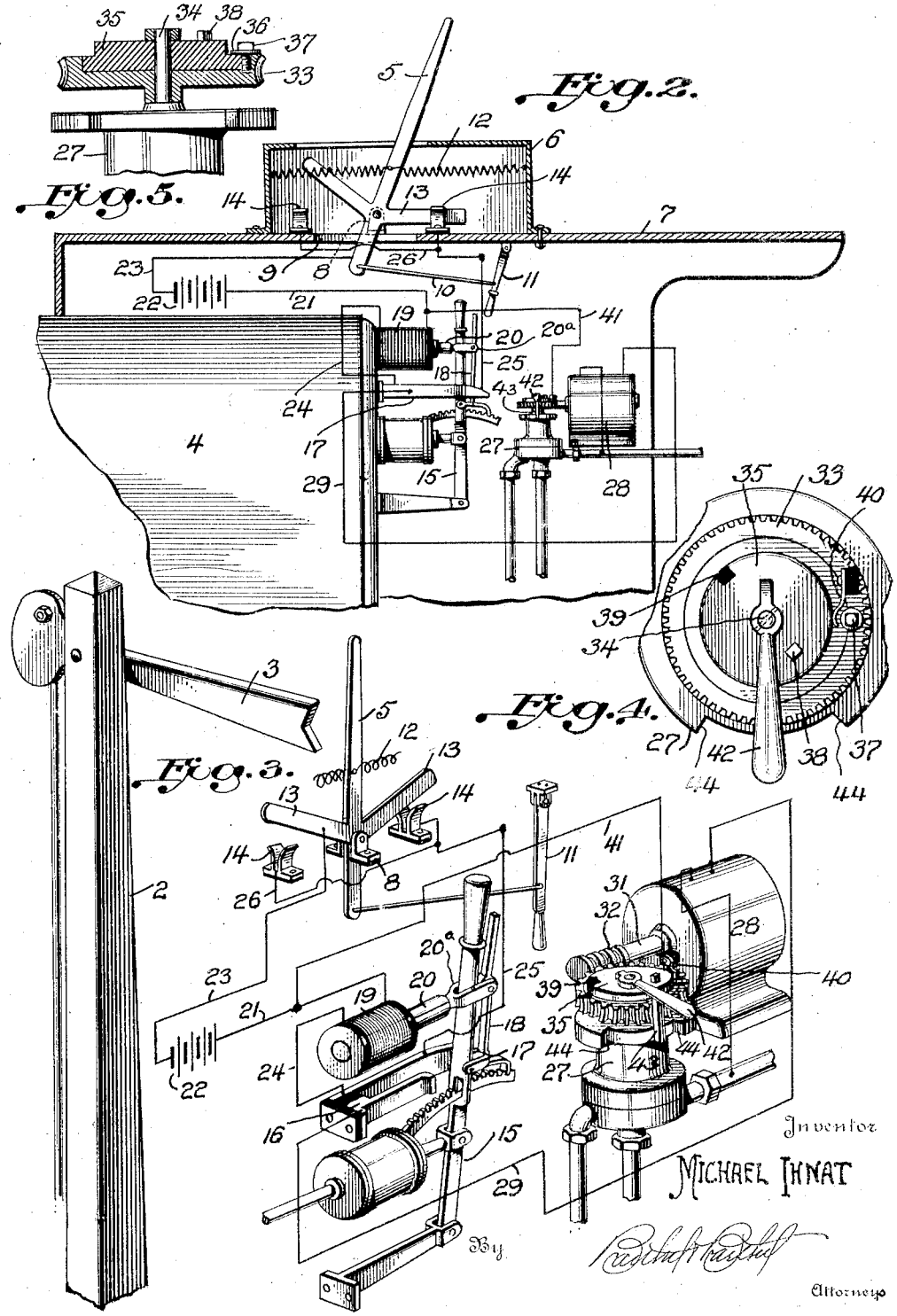
Inventor
MICHAEL IHNAT
Attorneys

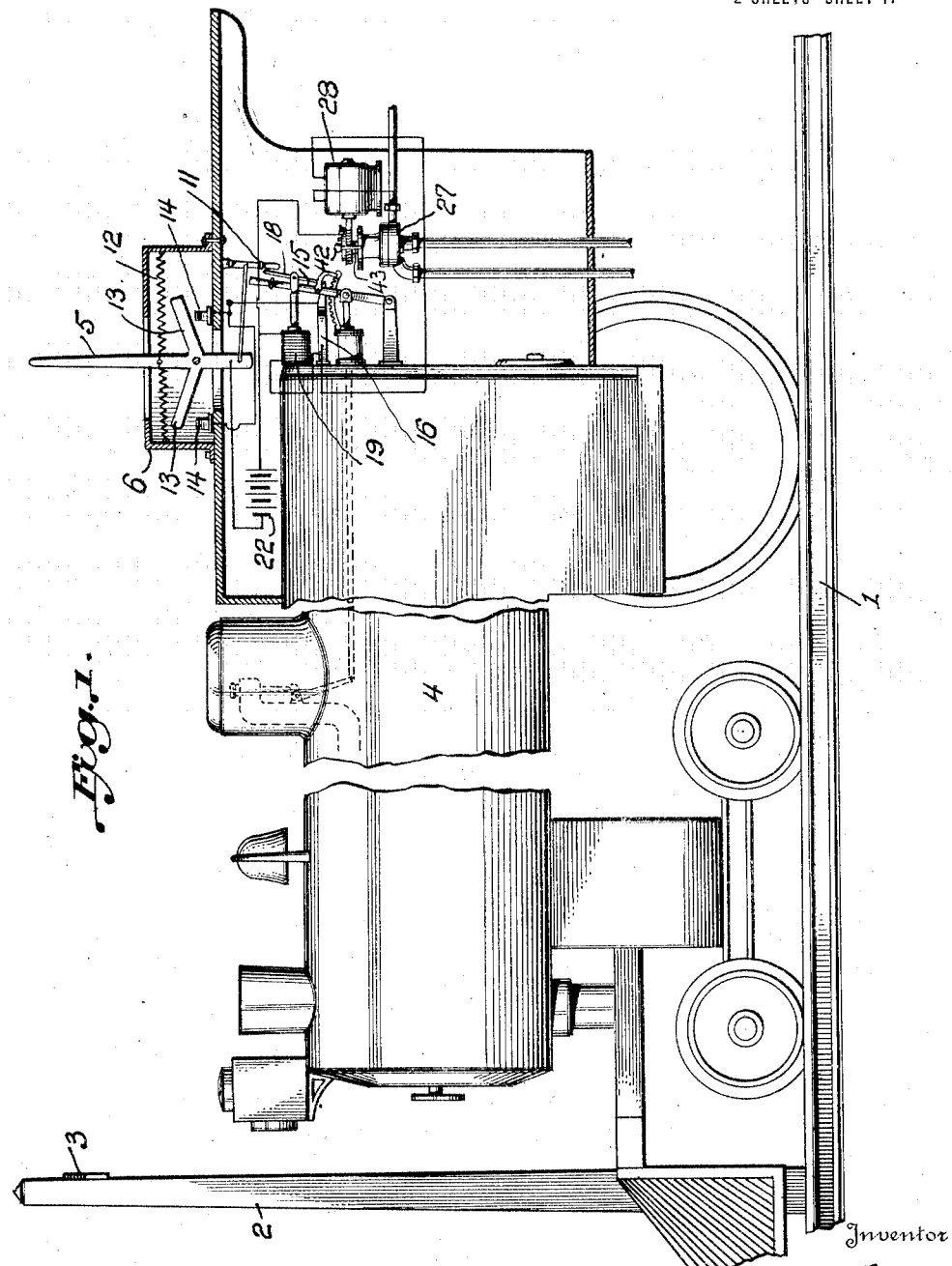

UNITED STATES PATENT OFFICE.

MICHAEL IHNAT, OF DETROIT, MICHIGAN.

RAILWAY SAFETY APPLIANCE.

1,349,834.  Specification of Letters Patent.  Patented Aug. 17, 1920.

Application filed December 31, 1917. Serial No. 209,788.

*To all whom it may concern:*

Be it known that I, MICHAEL IHNAT, a citizen of the United States of America, residing at Detroit, in the county of Wayne and State of Michigan, have invented certain new and useful Improvements in Railway Safety Appliances, of which the following is a specification, reference being had therein to the accompanying drawings.

This invention relates to a railway safety appliance and has especial reference to a locomotive equipment automatically operable to prevent the locomotive or train from passing through a danger block, thereby preventing rear-end collisions, and other accidents resulting from engineers neglecting or disobeying signals in connection with the block system of a railroad.

My invention aims to provide electrical means for successively shutting off the supply of steam to the cylinders of an engine and causing the air brakes to be applied, whereby the locomotive or train drawn thereby will be brought to a standstill immediately on entry of a block which has been indicated dangerous by the common semaphore arm signal. In connection with this purpose the mechanism is designed for operation irrespective of the direction in which the locomotive is traveling.

My invention further aims to provide a motor actuated engineer's valve for the air brake system of a train, and a solenoid actuated throttle for the steam or power of the train. These electrically actuated devices are associated with a two-way switch carried by the cab of a locomotive and adapted to be operated by coming in contact with a semaphore arm set at danger.

My invention will be hereinafter specifically described and claimed and reference will now be had to the accompanying drawings in which:

Figure 1 is a side elevation of a portion of a locomotive, showing the cab thereof in section, and the locomotive provided with a safety appliance constructed in accordance with this invention.

Fig. 2 is an enlarged sectional view of a portion of a locomotive cab showing the safety appliance equipment.

Fig. 3 is a perspective view of the safety appliance equipment and a semaphore arm set at danger, the wiring of the electrical devices being illustrated.

Fig. 4 is a plan view of the engineer's valve of the air brake system.

Fig. 5 is a detail sectional view of the upper portion of the same.

In the drawing, 1 designates a portion of a track and 2 a semaphore post having a semaphore arm 3 at the upper end thereof adapted, when in a danger position to extend over the tracks so that a locomotive 4 may pass under the semaphore arm. The semaphore arm and its operating or controlling mechanism forms no part of my invention, but is used as an overhead medium for actuating a switch 5 protruding from a casing 6 mounted on the roof 7 of the cab of the locomotive. The switch 5 is pivoted between insulated bearings 8 carried by the roof of the cab and the lower edge of the switch extends through a slot 9 in the cab roof 7 and is connected by a rod 10 to a reseating lever 11 suspended from the cab roof 7.

Within the casing 6 are coiled springs 12 attached to the switch 5 and adapted to maintain said switch in an upright neutral position as illustrated in Fig. 1, and said switch has knives or contact arms 13 adapted to engage contact members 14 carried by and insulated from the cab roof 7.

The end of the locomotive boiler supports a conventional form of steam controlled throttle 15 and adjacent said throttle are long and short insulated switch blades 16 which with said throttle constitutes a switch by reason of the throttle lying between said switch blades and establishing an electric circuit. A locking mechanism 18 is associated with the throttle 15 to hold the throttle normally stationary, and the locking mechanism is released by the initial movement of a core 20 forming part of a solenoid 19 supported above the switch blade 16 with the core 20 of said solenoid provided with a yoke 20ª through which the throttle extends, said yoke being connected to the locking mechanism.

The solenoid 19 is connected by a wire 21 to a battery 22 or a suitable source of electrical energy and said battery by wire 23 to the switch 5. The solenoid is also connected by a wire 24 to the long switch blade 17 and said blade by a wire 25 to the contact members 14 at one side of the switch. It is therefore evident that when the switch is actuated by the semaphore arm 3 and a blade or arm 5 of said switch engages one set of contact members 14 that a circuit is completed through the solenoid 19 to energize said solenoid and move the throttle 15 so that the steam will be shut off from the cylinders of the locomotive.

The other set of contact members 14 is connected by a wire 26 of the first mentioned set of contacts 14 so that the switch 5 may be actuated when the locomotive is traveling in the opposite direction. The contact member 24 will hold the switch 5 closed in either position against the action of the springs 12, but said switch may be restored or reset to a neutral position by the lever 11.

Suitably supported within the cab 7 adjacent the engineer's valve 27 is an electric motor 28 connected by a wire 29 to the short motor blade of the throttle switch 16 and said motor may be suitably grounded by a wire 30. The armature shaft 31 of the electric motor has a worm 32 meshing with a horizontally disposed gear wheel 33 loosely mounted upon the spindle 34 of the engineer's valve. Set in the upper face of the gear wheel 33 is a head 35 clamped to said gear wheel 33 by a washer 36 and a retaining member 37 preferably in the form of a screw whereby the head 35 is caused to rotate with the gear wheel 33. On the head 35 is a lug 38 and a circuit breaker 39 which is preferably in the form of a block of insulation arranged to engage a contact finger 40 carried by and insulated from the motor 28. The contact finger 40 normally bears against the head 35 at a point beyond the circuit breaker 39, and said finger 40 is connected with a wire 41 to a wire 21 leading to the battery 22, thus establishing a circuit through the motor 28 when the switch 5 is actuated, and the circuit is adapted to be broken when the head 35 is rotated by the gear wheel 33 and the circuit breaker carried to and engaged with the finger 40.

Fixed on the upper end of the valve spindle 34 is a handle or operating lever 42 which permits an engineer to operate the engineer's valve in the usual manner for controlling the air brakes of the locomotive or the train of cars attached thereto. The operating lever 42 has a depending arm 43 adapted to engage stop shoulders 44 of the valve 27, and the said shoulders 44 limit the relative movement of the operating handle or lever and define the opening and closed positions of the engineer's valve.

In the operation, I will assume that the engineer of the locomotive neglects to note the position of the semaphore arm 3 and enters a danger block as the locomotive passes under the semaphore arm 3, the upper end of the switch 5 is swung rearwardly to the position shown in Fig. 2, thereby establishing a circuit through the solenoid 19, which in turn shifts the throttle 15 cutting off the supply of steam to the engine cylinders.

As the throttle is moved between the long and short switch blades a circuit is established in connection with the motor 28 and as the gear wheel 33 and the head 35 rotate, the lug 38 is carried into engagement with the handle or lever 42 causing the engineer's valve to set the air brakes. The head 35 is only partially rotated as the circuit breaker engages the fingers 40 and breaks the circuit of the motor 28, thereby causing the cessation in the actuation of the air valve. By cutting off the steam and applying the brakes the locomotive is stopped at a short distance within the danger block and when the engineer finds that he can safely proceed, the switch 5 may be restored to neutral position and the throttle 15 and lever 42 manually manipulated to start the locomotive.

After each operation of the air brake valve by the motor 28, the retaining screw or member 37 may be loosened to permit the head 35 being restored to normal position as shown in Fig. 4 relative to the operating handle 42 of the air valve. This is necessary on account of the gear wheel 33 being held by the worm 32 and obviates the necessity of rotating the armature shaft 31 of the motor 28. After the head 35 has been reset the retaining screw or member 37 may be engaged with the head for holding the latter in fixed adjustment, thus again locking the head for rotation with the gear wheel 33, so that the motor 28 may again operate the engine valve when the motor circuit is closed by either one of the switches of the locomotive.

What I claim is:—

1. In a railway safety appliance, the combination with a solenoid of a throttle lever operatively connected therewith, an electric circuit closed by the movements of said lever, an electric motor energized by said circuit, a valve, a rotatable head operatively connected with said motor, a lever for operating said valve, a projection on said head adapted to engage and operate said lever and means on said head and motor for opening said electric circuit to prevent the operation of the motor and to permit the cessation of the action of the valve.

2. In an automatically acting train stopping device, a primary circuit closing device, a solenoid in said circuit, a lever operated thereby, a motor and motor circuit, a switch in said motor circuit closed by said lever, a valve, a lever for manually operating said valve and a member operated by said motor for actuating said lever.

3. In a train stopping device, a brake valve, a motor and circuit, a gear rotated by said motor, a rotatable head operatively connected with said gear, a lever operatively connecting said valve, and means on said head for engaging said lever to operate said valve.

4. In a train stopping device, a brake valve, a motor and circuit, a gear rotated by said motor, a rotatable head operatively connected with said gear, a lever operatively connected with said valve, means for detachably connecting said head and gearing and means on said head for engaging said lever to operate said valve, and means on said head for braking the motor circuit when the said valve has been actuated.

In testimony whereof I affix my signature in the presence of two witnesses.

MICHAEL IHNAT.

Witnesses:
 KARL H. BUTLER,
 ANNA M. DORR.